United States Patent
Berstis

(10) Patent No.: US 6,931,520 B2
(45) Date of Patent: Aug. 16, 2005

(54) POWER MANAGEMENT DELAY SYSTEM USING MOUSE POINTER INDICATOR TO INDICATE POWER-UP DELAY DURING POWERING UP A POWERED DOWN DISK DEVICE

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 803 days.

(21) Appl. No.: 09/859,311

(22) Filed: May 17, 2001

(65) Prior Publication Data

US 2002/0174370 A1 Nov. 21, 2002

(51) Int. Cl.[7] .......................... G06F 15/177; G06F 1/32
(52) U.S. Cl. ................. 713/1; 713/2; 713/300
(58) Field of Search ............. 713/1, 2, 300; 345/473, 839

(56) References Cited

U.S. PATENT DOCUMENTS

| | | | | |
|---|---|---|---|---|
| 5,610,824 A | * | 3/1997 | Vinson et al. | 700/182 |
| 5,758,155 A | * | 5/1998 | Circenis | 713/2 |
| 6,064,387 A | * | 5/2000 | Canaday et al. | 345/839 |
| 6,507,345 B1 | * | 1/2003 | Tojo | 345/473 |
| 6,625,728 B1 | * | 9/2003 | Ahrens et al. | 713/2 |

FOREIGN PATENT DOCUMENTS

| | | | |
|---|---|---|---|
| JP | 2-272618 | * | 11/1990 |
| JP | 4-198986 | * | 7/1992 |

OTHER PUBLICATIONS

"Process Termination via Mouse Cursor Direct Manipulation", IBM TDB, Apr. 1994, vol. 37, pp99–100.*

Andres S. Tanenbaum, "Structured Computer Organization" second edition, 1984, pp 10–12.*

* cited by examiner

*Primary Examiner*—Chun Cao
(74) *Attorney, Agent, or Firm*—Duke W. Yee; Marilyn Smith Dawkins; Wayne P. Bailey

(57) ABSTRACT

A method, computer program product, and data processing system for notifying the user of a power management delay is disclosed. In a preferred embodiment, the notification is by means of a change in a mouse cursor in a graphical user interface.

20 Claims, 3 Drawing Sheets

POWER MANAGEMENT DELAY SYSTEM USING MOUSE POINTER INDICATOR TO INDICATE POWER-UP DELAY DURING POWERING UP A POWERED DOWN DISK DEVICE

BACKGROUND OF THE INVENTION

1. Technical Field

The present invention is directed generally toward a method, computer program product, and data processing system for user notification of an event. More specifically, the present invention is directed toward a method, computer program product, and data processing system for notifying a user that a delay due to a necessary powering up of a peripheral device is occurring.

2. Description of Related Art

The manipulation of data in a data processing system is well known in the prior art. Data may be manipulated in many ways in a modern state-of-the-art data processing system including: data accessing, data encoding, data communications, data compression, data conversion, data entry, data exchange, data filing, data linking, data locking, data manipulation, data mapping, data modeling, data processing, data recording, data sorting, and data transferring. The large amounts of data that are available to the user of modern state-of-the-art data processing systems often become overwhelming in magnitude and complexity. These situations may often arise in the creation and execution of multimedia presentations.

Data processing systems are capable of communicating information to users in many formats, including: text, graphics, sounds, animated graphics, synthesized speech, and video. Multimedia presentations employ a data processing system to combine such information formats into a coherent and comprehensive presentation to the user.

As a result of the increasing complexity of data processing systems and with the introduction of multimedia presentations, attempts have been made to simplify the interface between a user and the large amounts of data present within a modern data processing system. One example of an attempt to simplify the interface between a user and a data processing system is the utilization of a so-called graphic user interface (GUI) to provide an intuitive and graphical interface between the user and the data processing system. A GUI is an interface system, including devices, by which a user interacts with a system, system components, and/or system applications via windows or view ports, icons, menus, pointing devices, etc.

Although GUIs have made manipulation of data easier for users in some instances, GUIs have created new problems. For example, a user working in an application frequently selects items from an application menu toolbar. This interaction will require the user to move a pointer via a mouse over a graphical object such as a menu, icon, or control to make a selection.

The term "mouse," when used in this document, refers to any type of operating system supported graphical pointing device including, but not limited to: a mouse, track ball, touch pad, light pin, touch screen, and the like. A pointing device is typically employed by a user of the data processing system to interact with the data processing system's GUI. A "mouse cursor" or "pointer" is an iconic image controlled by a mouse or other such device, and is displayed on the video display device of a data processing system to visually indicate to the user icons, menus, or other types of graphical objects that may be selected or manipulated.

A typical graphical user interface will not only allow a user to perform operations with the mouse, but also will display some kind of information to the user regarding the status of the data processing system. An example of this is an icon showing that a document is printing or a mouse cursor changing to an hourglass shape to inform the user that the user must wait for processing to occur before proceeding.

In some instances, such status displays can have a comforting effect on a user who needs feedback and reassurance that the system is doing what it is supposed to be doing. A good example of this is an iconic display to show when data is being received or transmitted by a modem. Such an iconic display is used in Windows 95, an operating system produced by Microsoft, Inc. of Redmond, Wash. When a user is downloading a file or web page and the system seems to take an inordinate amount of time to do so, it is comforting to a user to know that data is being successfully transmitted or received.

One particular area where this comforting effect would be desirable is when a power management delay or "power-up" delay occurs. Certain peripheral devices in a data processing system, including storage devices such as disk drives in particular, can be deactivated or "powered down" by an operating system during times of low usage. Powering down a device, as the name implies, reduces energy consumption.

Often, however, a powered-down device will need to be "powered up" again, such as when an operating system employing virtual memory needs to retrieve the next set of instructions or data from a disk drive. When this occurs, the data processing system will often be forced to wait for the device to power up. In the case of a disk drive, this means waiting for the drive motor to come up to speed, which can take several seconds.

While this waiting takes place, the user is often unable to do anything, except perhaps move a mouse cursor in some instances. At least while the power-up delay is taking place, this looks no different than a system crash, where a system grinds to a halt in response to some malfunction.

It is understandably disconcerting to a user when the system goes into such a delay mode. A user who is unable to tell whether his or her data processing system is operating properly is liable to become angry, scared, or otherwise emotionally disturbed. A user in such a predicament may resort to any number of undesirable or destructive behaviors, including those that end up destroying the user's own data.

What is needed, then, is a means for reassuring a user that a power-up delay, rather than a malfunction, is occurring.

SUMMARY OF THE INVENTION

The present invention is directed toward a method, computer program product, and data processing system for notifying the user of a power management delay. In a preferred embodiment, the notification is by means of a change in a mouse cursor in a graphical user interface.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
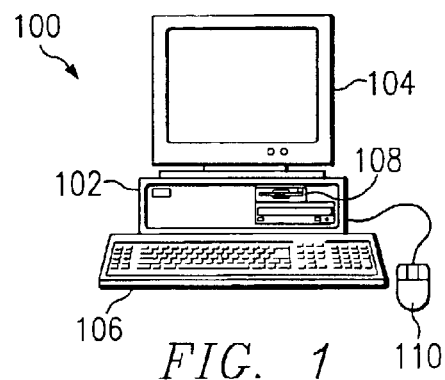
FIG. 1 is a diagram of a data processing system in which the processes of the present invention can be implemented.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 102, a video display terminal 104, a keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
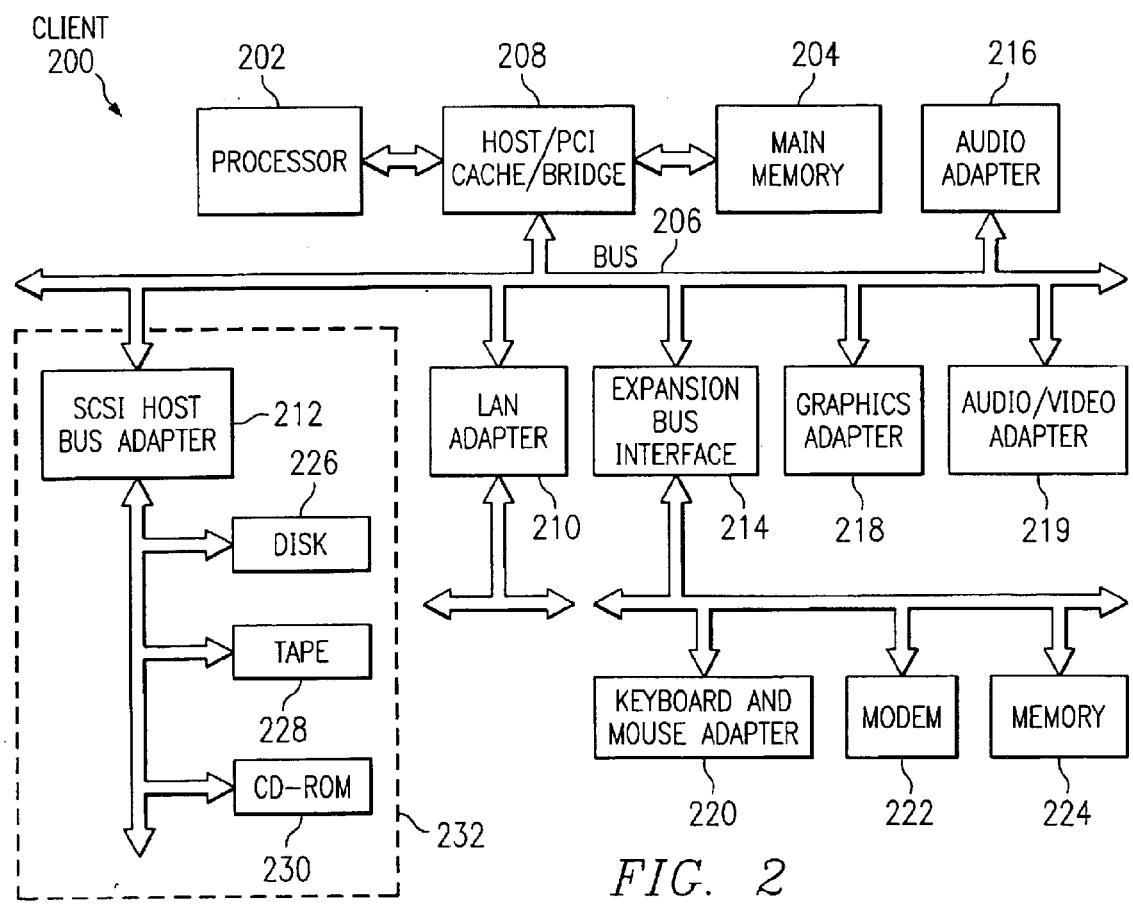
FIG. 2 is a block diagram of a data processing system in which the processes of the present invention can be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

The present invention provides a method of indicating to a user of a data processing system that the system must pause to allow a peripheral device to power up before proceeding. In the typical case, this pause will involve the powering of a hard drive or other storage device.

Figure 3:
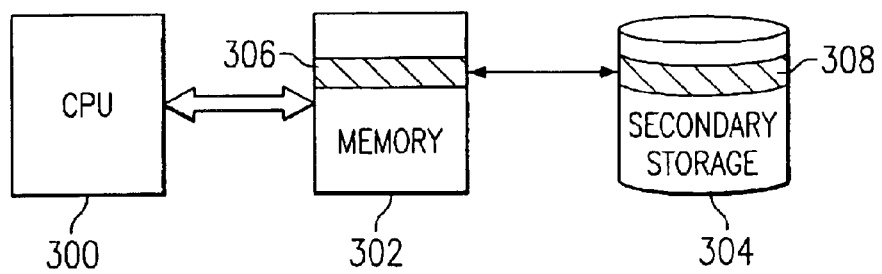
FIG. 3 is a diagram depicting the operation of virtual memory in a data processing system in accordance with a preferred embodiment of the present invention.

FIG. 3 is a diagram containing a simplified depiction of virtual memory in a data processing system in accordance with an embodiment of the present invention. Central processing unit 300 processes data and instructions contained in memory 302. Memory 302 is generally relatively limited in capacity, as compared to secondary storage 304, which is usually made up of disk drives or other mass storage devices. Because memory 302 is limited, virtual memory provides a way to store large amounts of data and instructions by swapping blocks of data and instructions from locations in memory 302 such as location 306 to locations within secondary storage 304 such as location 308. When an item of data or instructions is needed by central processing unit 300, it can be loaded into memory 302. When it is not needed, it can be stored in secondary storage 304 until it is needed.

Figure 4:
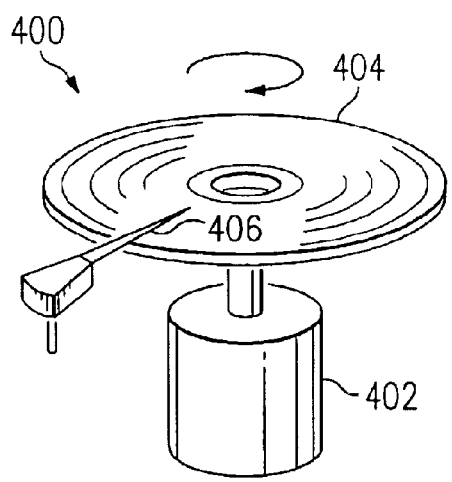
FIG. 4 is a diagram of the internals of a hard disk drive.

This added storage capacity comes with a price, however, and that price is speed. It takes time to swap data between memory 302 and secondary storage 304; sometimes it results in very noticeable delays. This is particularly true when a device in secondary storage 304 has not been used for some time and has been powered down to conserve energy. FIG. 4 shows why this is so.

FIG. 4 is a simplified diagram depicting the internals 400 of a computer hard drive in accordance with a preferred embodiment of the present invention. Electric motor 402 turns rotating magnetic disk 404. Data is read from and written to magnetic disk 404 by read/write head 406 as magnetic disk 404 rotates. Read/write head 406 itself rotates to position itself over concentric rings of magnetic signal recorded on magnetic disk 404.

Operating system software executed by the central processing unit is used to control the operation of the disk drive. In addition to the basic reading and writing operations, many operating systems will also power down a disk drive when not in use, so as to conserve energy. This is an effective energy-saving technique, because electric motors consume a relatively large amount of power when compared to semiconductor chips such as the central processing unit and memory.

Reading from or writing to magnetic disk 404 requires that magnetic disk 404 be rotating at a constant speed. When the hard drive powers down to save energy, however, electric motor 402 stops. When the drive is powered up again for use, electric motor 402 must be started. As with all motors, it takes some time before electric motor 402 can come up to speed.

If the next instructions for the central processing unit to execute are being loaded from the drive, the central processing unit has no choice but to wait until those instructions are finally loaded before proceeding. If this means that the drive must be powered up again, then the central processing unit must wait until electric motor 402 comes up to speed before proceeding.

In currently available data processing systems, the user is given no indication that this power-up was taking place. Thus, it appears in these systems that no activity is taking place (aside from perhaps the user's ability to move a mouse cursor; moving a mouse cursor is an independent interrupt-driven operation that does not rely on virtual memory). This situation, at least while it is occurring, is indistinguishable from a crash or freeze. A computer crashes when some hardware or software malfunction (sometimes the result of a design error) causes the computer to stop responding to a user.

The present invention rectifies this situation by giving the user a visual cue that a power-up delay is occurring. It is most reassuring to a user to know that a delay is the result of a normal operation, rather than a malfunction. Indicating to the user that the computer is simply powering up a hard drive or other peripheral may prevent a user from unnecessarily restarting an apparently non-responsive, but properly functioning computer.

Figure 5:
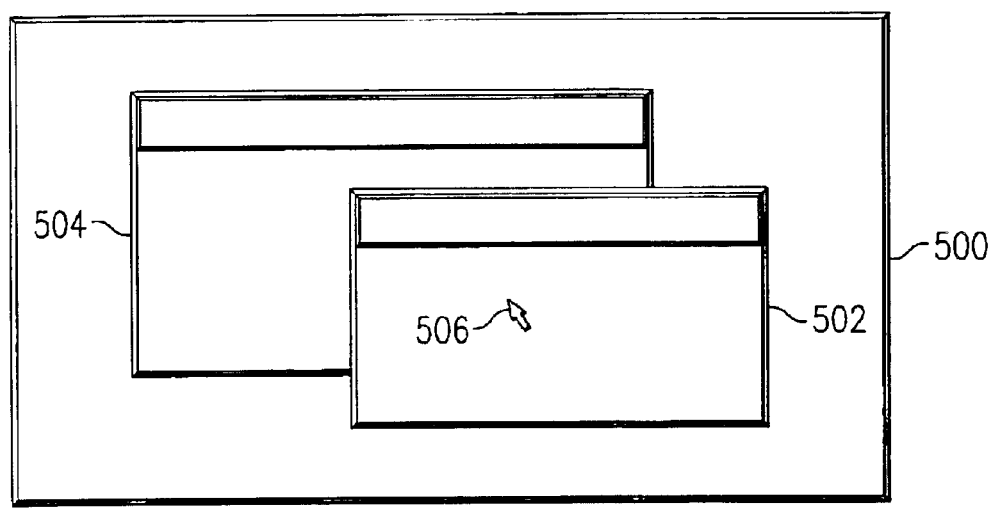
FIG. 5 is a diagram depicting a graphical user interface.

FIG. 5 is a screen shot showing features of a graphical user interface (GUI) 500 in accordance with an embodiment of the present invention. GUI 500 contains graphical features such as windows 502 and 504. A user moves mouse cursor 506 around the screen with a mouse, such as mouse 110 in FIG. 1. When a button on the mouse is pressed, a graphical feature pointed to by mouse cursor 506 is actuated. For instance, if mouse cursor 506 is used to actuate window 504, window 504 will move to the foreground of the display.

Figure 6A:
FIGS. 6A–6E depict mouse cursors that may be used in a preferred embodiment of the present invention.
Figure 6B:
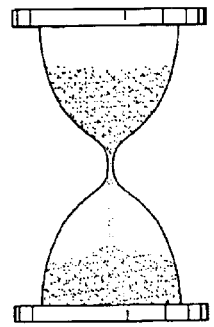

Most graphical user interfaces that use mouse cursors will use a number of different designs of mouse cursors. FIG. 6A and FIG. 6B depict two mouse cursors commonly used in graphical user interfaces. FIG. 6A depicts an arrow, which is the customary cursor for actuating graphical user interface features. FIG. 6B depicts an hourglass. Customarily, the arrow-shaped cursor of FIG. 6A will be replaced by the hourglass cursor of FIG. 6B whenever the user is required to wait for the central processing unit to complete some processing of data before the user may proceed. Some operating systems such as MacOS, produced by Apple Computer, Inc. of Cupertino, Calif., use a clock or watch as the "wait" cursor, rather than an hourglass.

According to a preferred embodiment of the present invention, operating system software replaces the current mouse cursor with hourglass cursor of FIG. 6B or another suitable cursor when it directs a peripheral device to power up. The cursor change informs the user that the user must wait until the power-up is completed before being able to proceed. Once the power-up has occurred, the cursor is restored to its former shape.

A number of suitable cursors are possible for indicating a power-up delay. FIGS. 6B–6E depict only a small number of them. The cursors depicted in FIGS. 6B–6E are by no means exhaustive. One of ordinary skill in the art will recognize that the set of suitable cursor designs is limited only by the imagination of operating system software developers; any cursor change that can reassure a user that the user need only wait will work.

Figure 6C:
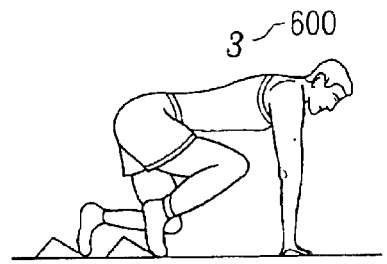

FIG. 6C depicts an animated mouse cursor shaped like a track runner at the starting line. Animated mouse cursors are well known within the graphical user interface art and are employed in various operating systems including the Windows operating system of Microsoft, Inc. in Redmond, Wash. and the aforementioned MacOS of Apple Computer, Inc. Graphic numeral display 600 can be counted down as the delay takes place. When the countdown is exhausted, the runner can then be displayed starting to run.

Operating system program code associated with animating the animated cursor can be provided with a time-frame over which the power-up delay will take place. In that way, an animated sequence, such as a countdown, can be timed so that the entire sequence will last as long as the delay and no longer. For instance, if it takes three seconds to power up a hard drive, the animation code can be informed by other operating system code that the animation sequence should last three seconds.

Figure 6D:
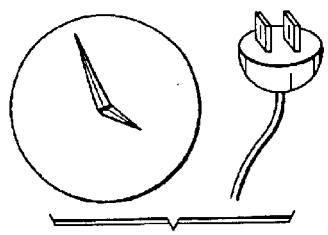
Figure 6E:
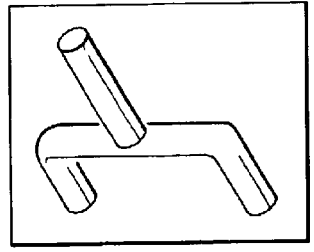

FIGS. 6D and 6E depict alternative cursor that may be employed within the present invention. FIG. 6D depicts a clock face and an electric plug, symbolizing a delay due to power management. FIG. 6E depicts an electric switch, also symbolizing electric power. One of ordinary skill in the art will appreciate that these cursors may be fixed or animated.

Figure 7:
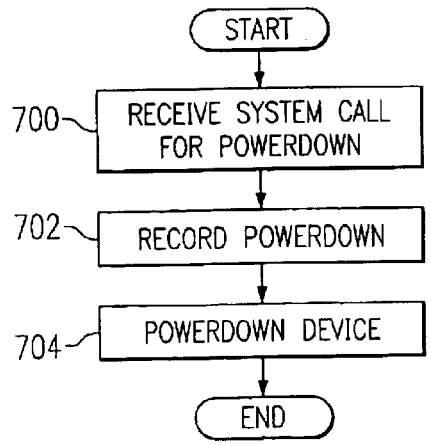
FIG. 7 is a flowchart representation of a process of powering down a device in accordance with a preferred embodiment of the present invention.

FIG. 7 is a flowchart representation of a process of powering down a peripheral device in accordance with an embodiment of the present invention. First the operating system code responsible for powering down the device receives a system call from another sequence of code, possibly an interrupt service routine for a timer (step 700). An interrupt service routine is a routine of executable code that executes whenever an interrupt is generated. An interrupt is an event that interrupts the central processing unit from the task at hand. Interrupts may be generated by software or by hardware. A typical situation in which an interrupt occurs is when a hardware timer, such as the "8253" or "8254" programmable interval timer built into IBM PC-compatible computers, is programmed to generate an interrupt after a certain amount of time has expired. When this occurs, the processor is interrupted and begins to execute an interrupt service routine.

Next, the operating system records in memory that the device is being powered down (step 702). Finally, the operating system directs the device to power down (step 704). Some devices can be programmed to power down by themselves at specific times, without the intervention of the operating system or device driver. In these situations the device driver would make provisions to know when such power down actions would occur.

Figure 8:
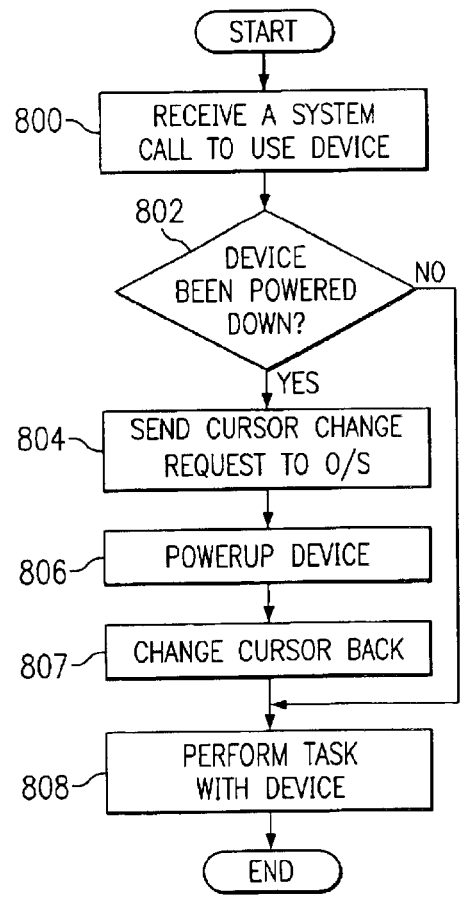
FIG. 8 is a flowchart representation of a process of operating a device that may be powered down in accordance with a preferred embodiment of the present invention.

In preparation for the next steps depicted in FIG. 8, the device driver and any other system code handling the mouse pointer would be written to retain in primary storage (e.g., memory 302 in FIG. 3) any programming code and image data required to display the special indication to the user that the system is waiting for a device to power up. In addition, portions of the device drivers for these power-managed devices associated with the handling of power-up notification to the mouse driver also need to be kept in primary storage.

If, for example, the code used to display the power-up wait indicator were not in primary storage, but were swapped out to the secondary storage device being waited on, it would be impossible to give the timely indication which is the subject of this invention. In a preferred embodiment of the present invention, therefore, whatever program code and data are needed for providing the power-up notification are locked into main memory, so that they cannot be swapped into secondary storage. Moreover, in a preferred embodiment, the program code and data needed for providing the power-up notification will have no dependencies on potentially powered-down components of the system.

FIG. 8 is a flowchart representation of a process of handling requests to perform tasks (such as reading or writing) with a device that can be powered down (such as a disk drive) in accordance with an embodiment of the present invention. First, the operating system receives a system call from other software to use the device (step 800). If the device has been powered down (step 802), a request for a cursor change and an expected amount of time delay are submitted to operating system software in charge of handling the appearance of the mouse cursor (step 804). The mouse pointer code may optionally show a series of images depicting an animation, timed to end with the expected time of availability of the powered down device. The device is powered up (step 806). At this point, operating system software may be directed to change the cursor to its previous appearance, or, if a specific time period was submitted to the operating system for the display of the cursor, the cursor can be changed back automatically (step 807). Finally, after the device has either been powered up or determined to already be powered up, the requested task is performed with the device (step 808).

One of ordinary skill in the art will appreciate that an indication of a power-up delay may take many forms, including but not limited to a mouse cursor. For instance, a power-up delay may be indicated by displaying a special icon on a portion of a display screen, rather than by changing a mouse cursor. Many possibilities for displaying an indication of a power-up delay exist.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMS, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for use in a data processing system, comprising:

powering up a device; and responsive to a determination that the device was placed in a power-down mode within the data processing system while the data processing system remained in a power-up mode, displaying an indication of a power-up delay during the powering up of the device.

2. The method of claim 1, wherein the indication is the display of an icon.

3. The method of claim 1, wherein the indication is displayed during a pre-determined time interval defined for display of the indication.

4. The method of claim 1, comprising: reversing the indication when the device has been powered up.

5. The method of claim 1, further comprising removing the indication of the power-up delay responsive an indication that the device has powered-up.

6. The method of claim 1, further comprising powering down the device and setting a power-down indicator to indicate the device is powered-down, wherein the displaying step is responsive to the power-down indicator indicating the device has previously been powered-down.

7. A computer program in a computer-readable medium, comprising computer executable code for:

powering up a device; and responsive to a determination that the device was placed in a power-down mode within the data processing system while the data processing system remained in a power-up mode displaying an indication of a power-up delay during the powering up of the device.

8. The computer program of claim 7, comprising:
reversing the device has been powered up.

9. The computer program product of claim 7, wherein the device is a disk drive.

10. A data processing system, comprising:
a bus system;
a processing unit connected to the bus system, wherein the processing unit includes at least one processor;
memory connected to the bus system;
a device connected to the bus system;
and a set of instructions within the memory, wherein the processing unit executes the set of instructions to perform the acts of:
powering up a device; and
responsive to a determination that the device was placed in a power-down mode within the data processing system while the data processing system remained in a power-up mode, displaying an indication of a power-up delay during the powering up of the device.

11. The data processing system of claim 10, wherein the indication includes a mouse cursor.

12. The data processing system of claim 11, wherein the mouse cursor includes a depiction of a runner.

13. The data processing system of claim 11, wherein the mouse cursor includes a depiction of one of an hourglass, a clock, a pocket watch, and a wristwatch.

14. The data processing system of claim 11, wherein the mouse cursor includes a depiction of one of a switch and an electric plug.

15. The data processing system of claim 11, wherein the mouse cursor is animated.

16. The data processing system of claim 15, wherein the mouse cursor includes a countdown.

17. The data processing system of claim 10, wherein the device is a disk drive.

18. The data processing system of claim 17, wherein the set of instructions is copied from the disk drive to the memory prior to placing the device in the power-down mode.

19. A method for use in a data processing system having a plurality of devices, comprising:
powering up the data processing system, including the plurality of devices;
powering down at least one of the devices while maintaining power to at least one other of the devices;
powering up the powered-down device; and
displaying an indication of a power-up delay during the powering up of the powered-down device.

20. A computer program in a computer-readable medium, comprising computer executable code for:
powering up the data processing system, including the plurality of devices;
powering down at least one of the devices while maintaining power to at least one other of the devices;
powering up the powered-down device; and
displaying an indication of a power-up delay during the powering up of the powered-down device.

* * * * *

UNITED STATES PATENT AND TRADEMARK OFFICE
CERTIFICATE OF CORRECTION

PATENT NO. : 6,931,520 B2
DATED : August 16, 2005
INVENTOR(S) : Berstis

It is certified that error appears in the above-identified patent and that said Letters Patent is hereby corrected as shown below:

Column 9,
Line 2, after "reversing" insert -- the indication when --.

Signed and Sealed this

Thirteenth Day of June, 2006

JON W. DUDAS
*Director of the United States Patent and Trademark Office*